US010439946B2

(12) United States Patent
Dinan et al.

(10) Patent No.: US 10,439,946 B2
(45) Date of Patent: Oct. 8, 2019

(54) TECHNOLOGIES FOR ENDPOINT CONGESTION AVOIDANCE

(71) Applicant: Intel Corporation, Santa Clara, CA (US)

(72) Inventors: James Dinan, Hudson, MA (US); Mario Flajslik, Hudson, MA (US); Robert C. Zak, Bolton, MA (US)

(73) Assignee: INTEL CORPORATION, Santa Clara, CA (US)

( * ) Notice: Subject to any disclaimer, the term of this patent is extended or adjusted under 35 U.S.C. 154(b) by 20 days.

(21) Appl. No.: 15/429,716

(22) Filed: Feb. 10, 2017

(65) Prior Publication Data

US 2018/0234347 A1 Aug. 16, 2018

(51) Int. Cl.

| | |
|---|---|
| ***H04L 12/825*** | (2013.01) |
| ***H04L 12/26*** | (2006.01) |
| ***H04L 12/801*** | (2013.01) |
| ***H04L 29/08*** | (2006.01) |

(52) U.S. Cl.

CPC .......... *H04L 47/25* (2013.01); *H04L 43/0894* (2013.01); *H04L 43/10* (2013.01); *H04L 47/12* (2013.01); *H04L 47/127* (2013.01); *H04L 67/1097* (2013.01)

(58) Field of Classification Search

CPC . H04L 1/18; H04L 1/24; H04L 67/025; G06F 13/28

See application file for complete search history.

(56) References Cited

U.S. PATENT DOCUMENTS

| | | | | |
|---|---|---|---|---|
| 5,268,906 A * | 12/1993 | Free | G06F 11/0763 | 714/708 |
| 7,010,607 B1 * | 3/2006 | Bunton | H04L 1/18 | 709/228 |
| 9,176,911 B2 * | 11/2015 | Davis | G06F 13/28 | |
| 2003/0035373 A1 | 2/2003 | Bass et al. | | |
| 2009/0222573 A1 * | 9/2009 | Grossner | H04L 47/10 | 709/235 |
| 2010/0169501 A1 * | 7/2010 | King | G06F 9/455 | 709/230 |
| 2010/0228878 A1 | 9/2010 | Munson et al. | | |
| 2012/0265837 A1 * | 10/2012 | Grant | H04L 67/025 | 709/212 |

OTHER PUBLICATIONS

Resource ReSerVation Protocol (RSVP), Request for Comments 2205, dated Sep. 1997 (112 pages).

(Continued)

*Primary Examiner* — Melanie Jagannathan

(74) *Attorney, Agent, or Firm* — Barnes & Thornburg LLP

(57) ABSTRACT

Technologies for endpoint congestion avoidance are disclosed. In order to avoid congestion caused by a network fabric that can transport data to a compute device faster than the compute device can store the data in a particular type of memory, the compute device may in the illustrative embodiment determine a suitable data transfer rate and communicate an indication of the data transfer rate to the remote compute device which is sending the data. The remote compute device may then send the data at the indicated data transfer rate, thus avoiding congestion.

14 Claims, 8 Drawing Sheets

(56) References Cited

OTHER PUBLICATIONS

Extended European Search Report for European patent application No. 18152201, dated Jun. 1, 2018 (10 pages).
Vishal Ahuja et al, "Introspective end-system modeling to optimize the transfer time of rate based protocols", High Performance Distributed Computing, ACM, 2 Penn Plaza, Suite 701 New York NY 10121-0701 USA, Jun. 8, 2011 (Jun. 8, 2011), pp. 61-72, XP058003848, DOI: 10.1145/1996130.1996140 ISBN: 978-1-4503-0552-5.
Matthew J K00p et al, "Designing high-performance and resilient message passing on InfiniBand", Parallel&Distributed Processing, Workshops and PhD Forum (IPDPSW), 2010 IEEE International Symposium on, IEEE, Piscataway, NJ, US, Apr. 19, 2010 (Apr. 19, 2010) pp. 1-7, XP031680227, ISBN: 978-1-4244-6533-0.

* cited by examiner

TECHNOLOGIES FOR ENDPOINT CONGESTION AVOIDANCE

GOVERNMENT RIGHTS CLAUSE

This invention was made with Government support under contract number H98230A-13-D-0124 awarded by the Department of Defense. The Government has certain rights in this invention.

BACKGROUND

In high performance computing (HPC), a relatively large number of compute devices may be linked together with a network fabric. The bandwidth of the network fabric in high performance computing environments is continually increasing. The increase in bandwidth may improve the performance of the HPC system, but the HPC system may need to be configured to use the additional bandwidth available.

In addition to the network fabric, the hardware of the compute devices in HPC systems is continually changing. In some HPC systems, compute devices may have several different memory technologies with different read and write bandwidths. Additionally, the paths used to access memory of a given type may have different bandwidths as a result of non-uniform memory access characteristics.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
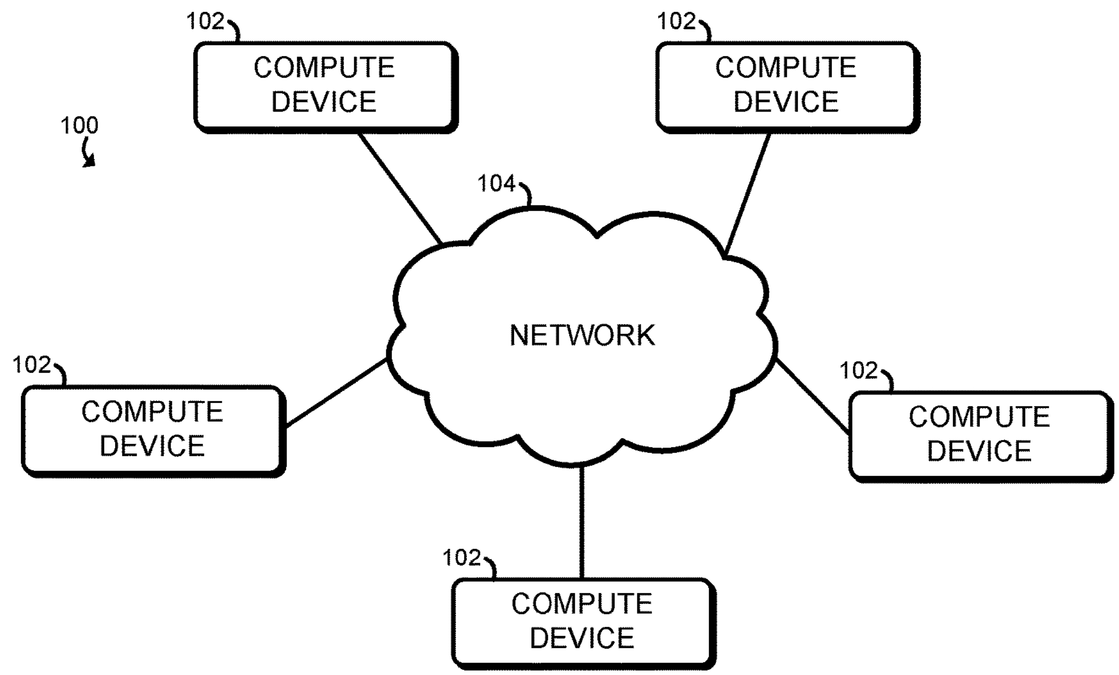
FIG. 1 is a simplified block diagram of at least one embodiment of a network for endpoint congestion avoidance.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to “one embodiment,” “an embodiment,” “an illustrative embodiment,” etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of “at least one A, B, and C” can mean (A); (B); (C): (A and B); (B and C); (A and C); or (A, B, and C). Similarly, items listed in the form of “at least one of A, B, or C” can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 includes several compute devices 102 which are connected by an illustrative network 104. In the illustrative embodiment, a data transfer rate supported by the network is higher than a data storage bandwidth of at least one of the compute devices 102 at least some of the time. For example, one or more of the compute devices 102 may have a memory that has a lower bandwidth than the maximum data transfer rate of the network 104. As such, if another compute device 102 attempts to send data to that compute device 102 at or near the maximum data transfer rate of the network 104, there may be endpoint congestion at the receiving compute device 102 since it may not be able to store the data in memory as quickly as it can receive the data over the network 104. In order to avoid such congestion, the sending compute device 102 may determine the data storage bandwidth available at the receiving compute device 102, and send the data at a rate of the data storage bandwidth. As discussed in more detail below, the sending compute device 102 may determine the available storage bandwidth in several different ways, such as by receipt of explicit rate from the receiving compute device 102 or from analyzing past performance data.

The network 104 may be embodied as any type of network capable of communicatively connecting the compute devices 102. For example, the system 100 may be embodied as a high performance computing system or a data center, and the network 104 may be established through a series of cables, switches, and other devices connecting the various compute devices 102 of the data center.

Figure 2:
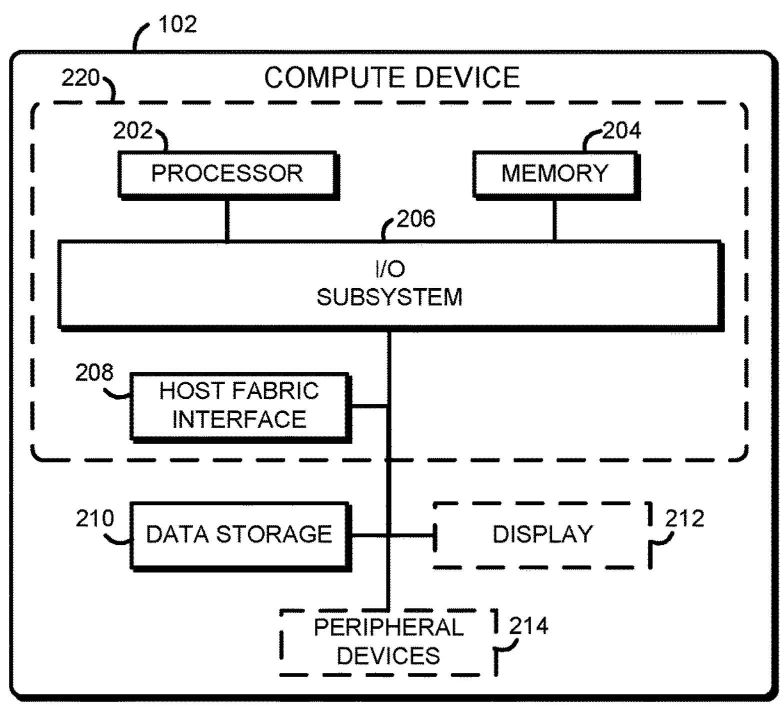
FIG. 2 is a simplified block diagram of at least one embodiment of a compute device of FIG. 1.

Referring now to FIG. 2, an illustrative compute device 102 of the system 100 may be embodied as any type of compute device capable of performing the functions described herein. For example, the compute device 102 may be embodied as or otherwise be included in, without limitation, a server computer, a desktop computer, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device.

The illustrative compute device 102 includes a processor 202, the memory 204, an input/output (I/O) subsystem 206, a host fabric interface 208, and data storage 210. In some embodiments, one or more of the illustrative components of the compute device 102 may be incorporated in, or otherwise form a portion of, another component. For example, the memory 204, or portions thereof, may be incorporated in the processor 202 in some embodiments.

The processor 202 may be embodied as any type of processor capable of performing the functions described herein. For example, the processor 202 may be embodied as a single or multi-core processor(s), a single or multi-socket processor, a digital signal processor, a graphics processor, a microcontroller, or other processor or processing/controlling circuit. The memory 204 may be embodied as any type of volatile or non-volatile memory or data storage capable of performing the functions described herein, such as any combination of dynamic random access memory (DRAM), memory devices that use chalcogenide phase change material (e.g., chalcogenide glass), 3-dimensional (3D) cross point memory, or other types of byte-addressable, write-in-place non-volatile memory, ferroelectric transistor random-access memory (FeTRAM), nanowire-based non-volatile memory, phase change memory (PCM), memory that incorporates memristor technology, magnetoresistive random-access memory (MRAM) or Spin Transfer Torque MRAM (STT-MRAM). In some embodiments, the memory 204 may include two or more different types of memory, such as a volatile, high-bandwidth memory and a non-volatile, low-bandwidth memory. In operation, the memory 204 may store various data and software used during operation of the compute device 102 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the compute device 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the compute device 102 on a single integrated circuit chip. For example, in some embodiments, each of the processor 202, the memory 204, the I/O subsystem 206, and the host fabric interface 208 may be embodied in one package 220 as a single system-on-a-chip or a multi-chip package.

In the illustrative embodiment, the memory 204 may be embodied as a main memory of the compute device 102 and may be stored in one or more dual in-line memory modules (DIMMs). It should be appreciated that, in some embodiments, the I/O subsystem 206 may be overloaded, and may not be able to transfer all of the desired data simultaneously. For example, the compute device 102 may use the same components of the I/O subsystem 206 to transfer data from one processor 202 to another processor 202, between the processor 202 and the memory 204, and between the host fabric interface 208 and the memory 204. As such, high utilization of the I/O subsystem 206 by, e.g., transferring data between the processor 202 and the memory 204 may impact the bandwidth available for other tasks, such as transferring data between the host fabric interface 208 and the memory 204.

The host fabric interface 208 may be embodied as any type of interface capable of interfacing the compute device 102 with the network 104. The host fabric interface 208 may also be referred to or be embodied as a network interface controller (NIC). The host fabric interface 208 may be capable of interfacing with any appropriate cable type, such as an electrical cable or an optical cable. The host fabric interface 208 may be configured to use any one or more communication technology and associated protocols (e.g., Ethernet, Bluetooth®, Wi-Fi®, WiMAX, near field communication (NFC), etc.). The host fabric interface 208 may be capable of directly accessing certain portions of the memory 204 based on instructions from the compute device 102 or based on messages received from other compute devices 102, including reading from and writing to those portions of the memory 204. The host fabric interface 208 may be capable of performing a particular interface, standard, or protocol, such as the Portals 4.0 Network Programming Interface, published by Sandia National Labs in November 2012 with designation SAND2012-10087, the Message Passing Interface Standard Version 3.1 (MPI 3.1), published by the Message Passing Interface Forum on Jun. 4, 2015, the OpenSHMEM 1.3 Application Programming Interface, published by Open Source Solutions, Inc., on Feb. 19, 2016, or similar operations that may employ direct memory access or a partitioned global address space (PGAS). In some embodiments, the host fabric interface 208 may include additional electrical components such as a dedicated processor and memory. Additionally or alternatively, in some embodiments, the host fabric interface 208 may include a pipeline architecture in which at least some of the functions performed by the host fabric interface 208 are performed by dedicated hardware devices or sub-components.

The data storage 210 may be embodied as any type of device or devices configured for the short-term or long-term storage of data. For example, the data storage 210 may include any one or more memory devices and circuits, memory cards, hard disk drives, solid-state drives, or other data storage devices.

Of course, in some embodiments, the compute device 102 may include additional components often found in a compute device 102, such as a display 212 and/or one or more peripheral devices 214. The peripheral devices 214 may include a keyboard, a mouse, a camera, etc.

The display 212 may be embodied as any type of display on which information may be displayed to a user of the compute device 102, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 3:
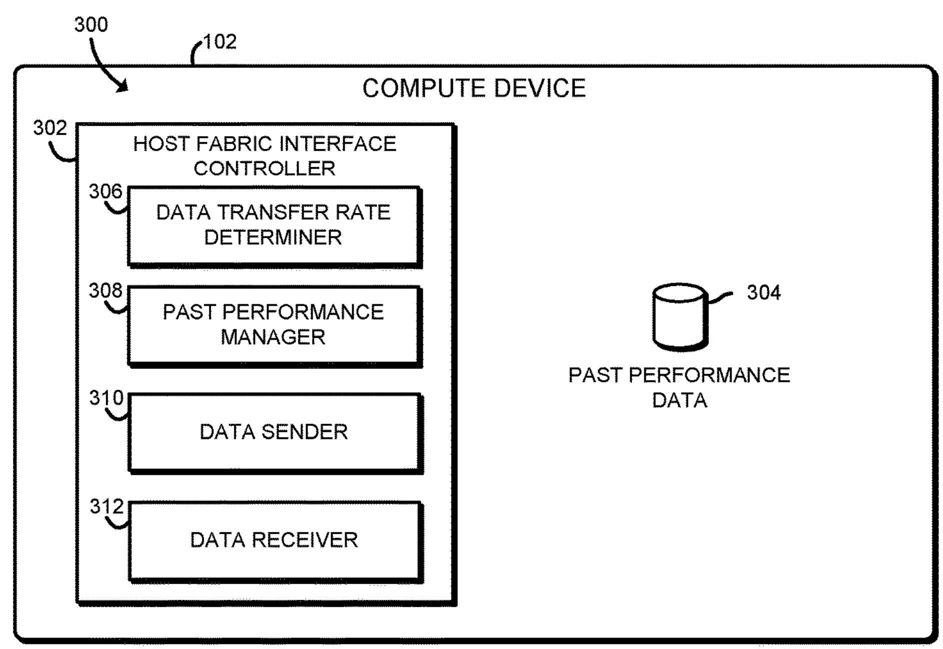
FIG. 3 is a block diagram of at least one embodiment of an environment that may be established by the compute device of FIG. 1.

Referring now to FIG. 3, in use, the compute device 102 may establish an environment 300. The illustrative environment 300 includes a host fabric interface (HFI) controller 302 and past performance data 304. The various components of the environment 300 may be embodied as hardware, firmware, software, or a combination thereof. As such, in some embodiments, one or more of the components of the environment 300 may be embodied as circuitry or collection of electrical devices (e.g., an HFI controller circuit 302, etc.). It should be appreciated that, in such embodiments the HFI controller circuit 302, etc. may form a portion of one or more of the processor 202, the I/O subsystem 206, the host fabric interface 208, and/or other components of the compute device 102. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the processor 202 or other components of the compute device 102.

The HFI controller 302 is configured to control the host fabric interface 208. The HFI controller 302 processes incoming messages from other compute devices 102 as well as instructions from the local compute device 102. The HFI controller 302 is configured to determine data to be sent and determine other parameters of a message such as a destination memory location. In some embodiments, the HFI controller 302 may perform all aspects of the functionality relating to adjusting a data transfer rate described herein without instruction or other contact with other components of the compute device 102. For example, the HFI controller 302 may adjust the data transfer rate in a manner that is transparent to a user of the compute device 102, an application being executed by the processor 202 of the compute device 102, an operating system being executed by the processor 202 of the compute device 102, etc. In other embodiments, the HFI controller 302 may have limited interaction with other components of the compute device 102, such as by determining the type of physical memory associated with a virtual memory address by querying another component of the compute device 102. In still other embodiments, the functionality of the HFI controller 302 relating to adjusting the data transfer rate may be partially or fully configurable or controllable by other components of the compute device 102.

The HFI controller 302 includes a data transfer rate determiner 306, a past performance manager 308, a data sender 310, and a data receiver 312. The data transfer rate determiner 306 is configured to determine a data transfer rate to be used for sending data either to or from the host fabric interface 208. The data transfer rate is or otherwise indicates a suitable storage bandwidth associated with the compute device 102 which will be receiving the data in question. The data transfer rate determiner 306 may determine the data transfer rate in any suitable manner, which may vary depending on the particular embodiment. For example, in some embodiments, the data transfer rate determiner 306 may determine a data transfer rate based on a memory bandwidth of the destination memory location. If the destination is a local memory address, the data transfer rate determiner 306 may access a table or query another component of the compute device 102 in order to determine a memory bandwidth of the destination memory location. In other embodiments, the data transfer rate determiner 306 may access past performance data, which may indicate a suitable data transfer rate for the data transfer in question. The past performance data may include both rates of past data transfers as well as context data associated with the past data transfers, such as particular memory locations associated with the data transfer, a particular state of an application being executed by the compute device 102, a particular type of message being sent, etc. In yet other embodiments, the data transfer rate determiner 306 may determine a suitable data transfer rate based on a current activity level of the I/O subsystem 206. The data transfer rate determiner 306 may do so in any suitable way, such as by monitoring the activity level of the I/O subsystem 206, by querying a component of the compute device 102 which monitors the activity level of the I/O subsystem 206, or by performing a test transfer over the I/O subsystem 206. In still other embodiments, the data transfer rate determiner 306 may determine a data transfer rate by receiving an indication of the data transfer rate to use from a remote compute device 102, such as the remote compute device 102 which will be receiving the data in question. The indication of the data transfer rate to use may be embodied as a specific rate to use, a range of rates to use, a certain proportion of a maximum range to use, or any other indication of a data transfer rate to use. Finally, in some embodiments, the data transfer rate determiner 306 may determine a data transfer rate from another component of the compute device 102, such as from an application or operating system being executed on the processor 202 of the compute device 102. For example, the application being executed on the processor 202 may know that the message is being sent to a memory location on the remote compute device 102 with a particular memory bandwidth, and determine a suitable data transfer rate accordingly, or the application may know that a particular action it is taking may use the I/O subsystem 206 such that the bandwidth of some or all of the memory 204 may not be fully available to the host fabric interface 208. Of course, it should be appreciated that in some embodiments the data transfer rate determiner 306 may determine a data transfer rate based on a combination of some or all of the above factors.

The past performance manager 308 is configured to manage the past performance data. The past performance manager 308 may update the past performance data when new performance data is available, such as any time a data transfer rate is determined by the data transfer rate determiner. In addition to storing the data transfer rate or an indication thereof, the past performance manager 308 may also store context information relating to the transfer in question, such as particular memory locations associated with the data transfer, a particular state of an application being executed by the compute device 102 when the data transfer occurred, a particular type of message being sent, an identifier of the remote compute device 102, an indication of the time of the data transfer, etc. In the illustrative embodiment, the past performance manager 308 may be configured to delete or disregard information relating to data transfers that were conducted more than a threshold period of time ago, such as any time from more than 10 milliseconds ago to more than 10 hours ago. In some embodiments, such as embodiments in which an application may be executed continuously for days or weeks, the threshold period may be longer, such as any time from more than 10 milliseconds ago to more than 10 days ago. In other embodiments, no threshold may be used, and information relating to data transfers may be kept until a more recent data transfer with a similar context occurs or until some other condition is met, such as the size of the past performance data exceeding a threshold.

The data sender 310 is configured to perform data send operations. The data sender 310 may perform any suitable type of send operation, including those defined by certain protocols such as Portals 4.0, MPI 3.1, or OpenSHMEM 1.3, and may perform operations using direct memory access or operations related to implementing a partitioned global address space. For example, in some embodiments, the data sender 310 may be assigned a message to send to a certain remote compute device 102. The data sender 310 may break the message into several packets, and begin sending packets at a certain data transfer rate to the remote compute device 102. The remote compute device 102 may send an acknowledgement of receipt of a packet, and the acknowledgement may contain an indication of a data transfer rate for the data sender to use 310 for subsequent packets. The data sender 310 may then send the remaining packets at the data transfer rate specified in the acknowledgement (of course, the data sender 310 need not wait for the acknowledgement of the first packet before sending out subsequent packets). In other embodiments, the data sender 310 may receive a read request from a remote compute device 102, which includes a local memory address of the memory 204 as well as an indication of a data transfer rate to use. The data sender 310 may access the memory address using direct memory access and send the data at the specified data transfer rate. In yet other embodiments, when the data sender 310 is ready to send a message to a remote compute device 102, the data sender 310 may send a ready to send (RTS) message to the remote compute device 102. When the remote compute device 102 is prepared to receive the message, the remote compute device 102 sends a clear to send (CTS) message to the data sender 310 that includes an indication of a data transfer rate. The data sender 310 may then send the data to the remote compute device 102 at the specified data transfer rate. It should be appreciated that, in some embodiments, the data sender 310 may additionally or alternatively send data at a data transfer rate determined by the data transfer rate determiner 306 described above.

The data receiver 312 is configured to perform data receive operations. The data receiver 312 may perform any suitable type of receive operation, including those defined by certain protocols such as Portals 4.0, MPI 3.1, or OpenSHMEM 1.3, and may perform operations using direct memory access or operations related to implementing a partitioned global address space. For example, in some embodiments, the data receiver 312 may begin receiving data from a remote compute device 102 by receiving a packet that includes some of the data in the message being sent, and, in response to receipt of the data, determine a data transfer rate suitable for the message being sent. The data receiver 312 may send an acknowledgement of the packet, and include an indication of the data transfer rate. The data receiver 312 may then receive the rest of the message at the specified data transfer rate, and store the data in the memory 204. In other embodiments, the data receiver 312 may determine a memory location of a remote compute device 102 which it should read, such as by receiving an instruction from an application being executed on the compute device 102. The data receiver 312 may determine a suitable data transfer rate and may send a read request to the remote compute device 102 that includes the memory location and an indication of the data transfer rate. In yet other embodiments, the data receiver 312 may receive a ready to send (RTS) message from a remote compute device 102, and may then determine a data transfer rate suitable for the message that is to be sent. The data receiver 312 may then send a clear to send (CTS) message to the remote compute device 102 which includes an indication of the data transfer rate. It should be appreciated that, in some embodiments, the data receiver 312 may additionally or alternatively send an indication of a data transfer rate determined by the data transfer rate determiner 306 described above.

Figure 4:
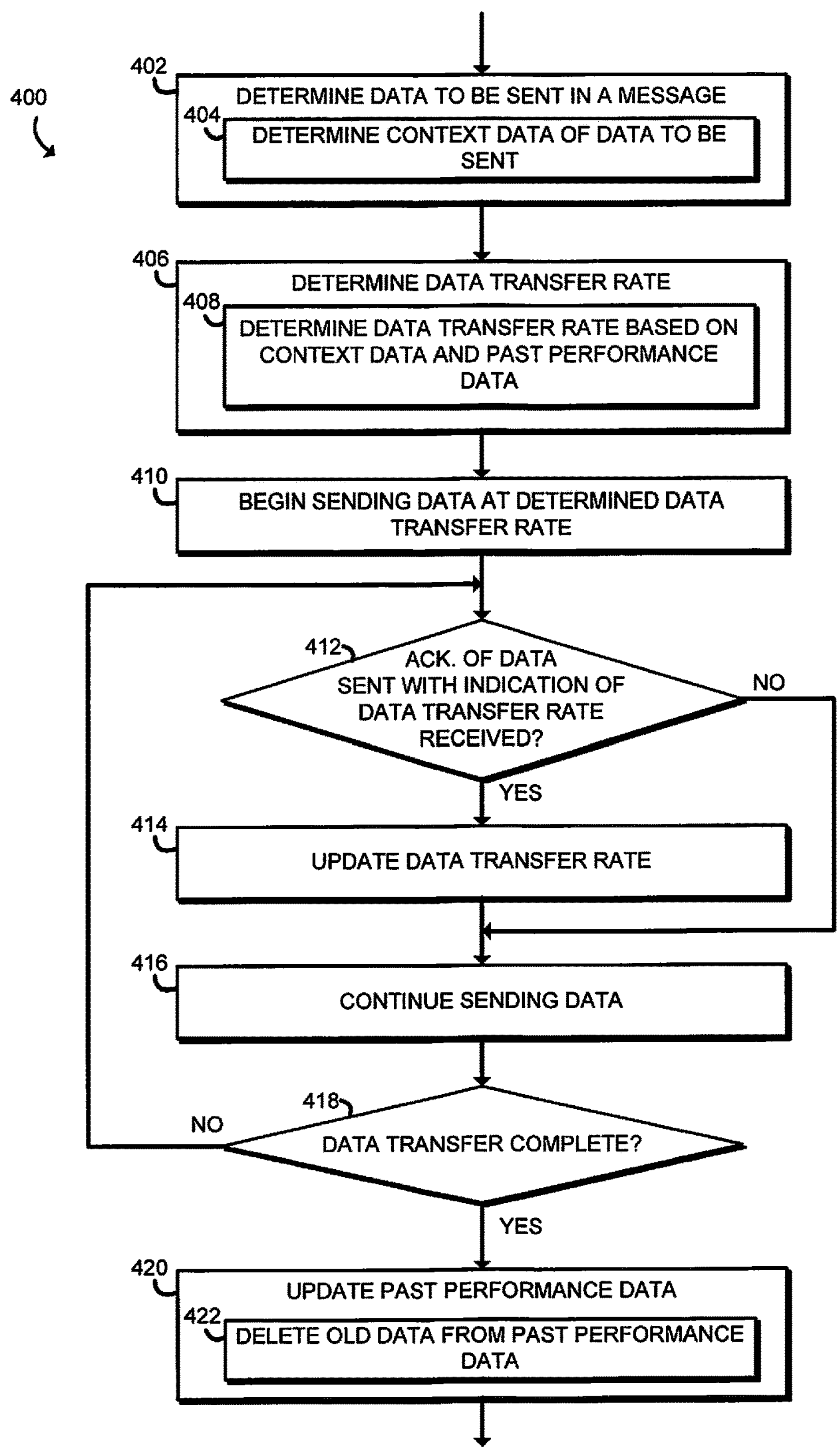
FIG. 4 is a simplified flow diagram of at least one embodiment of a method for sending data while avoiding endpoint congestion that may be executed by the compute device of FIG. 1.

Referring now to FIG. 4, in use, the compute device 102 may execute a method 400 for sending data while avoiding endpoint congestion. The method 400 begins in block 402, in which the compute device 102 determines or otherwise acquires data to be sent in a message to a remote compute device 102, such as by receiving instructions from an application being executed on the compute device 102. The compute device 102 determines context data of the data to be sent, such as a destination memory location for the data on the remote compute device 102, a particular state of an application being executed by the compute device 102, a type of the message being sent, etc., in block 404.

In block 406, the compute device 102 determines a data transfer rate. The compute device 102 may determine the data transfer rate based on the context data and past performance data in block 408, such as by determining a data transfer rate for a past data transfer with a similar context to the present context. For example, the compute device 102 may compare a destination memory location from the context data with the destination memory location of a past data transfer. If the destination memory location is the same, then the compute device 102 may use the same data transfer rate as that used for the past data transfer.

In block 410, the compute device 102 begins sending data at the determined data transfer rate to the remote compute device 102. It should be appreciated that when the compute device 102 sends the initial data in block 410, the compute device 102 may be sending data at a rate that is too high for the remote compute device 102. In block 412, if the compute device 102 has not received an acknowledgement of the data sent that includes an indication of an updated data transfer rate, the method jumps to block 416. Otherwise, if the compute device 102 has received an acknowledgement of the data send that includes an indication of an updated data transfer rate, the method 400 proceeds to block 414, in which the compute device 102 updates the data transfer rate to use for sending the rest of the message based on the indication of the updated data transfer rate.

In block 416, the compute device 102 continues sending data to the remote compute device 102, which may be sent at an updated data transfer rate if one was received from the remote compute device 102. In block 418, if the data transfer is not complete, the method 400 loops back to block 412 in which the compute device 102 checks if an updated data transfer rate has been received. Otherwise, if the data transfer is complete, the method 400 proceeds to block 420.

In block 420, the compute device 102 updates the past performance data with the updated data transfer rate, if an indication of one was received. In block 422, the compute device 102 may delete any old or obsolete data in the past performance data, such as any data related to a data transfer that occurred more than a threshold period of time ago.

Figure 5:
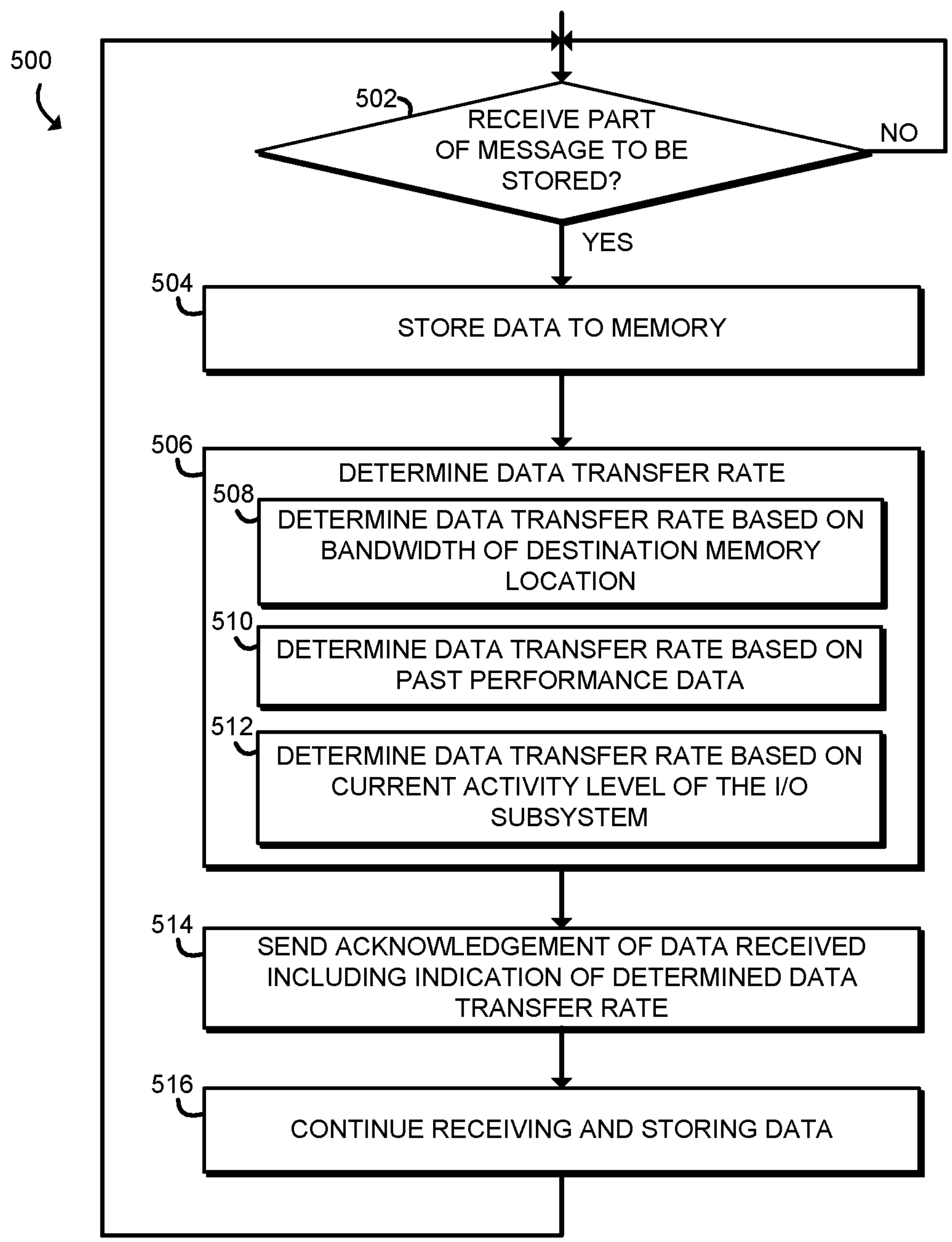
FIG. 5 is a simplified flow diagram of at least one embodiment of a method for receiving data while avoiding endpoint congestion that may be executed by the compute device of FIG. 1.

Referring now to FIG. 5, in use, the compute device 102 may execute a method 500 for receiving data while avoiding endpoint congestion. The method 500 begins in block 502, in which, if the compute device 102 has not yet received part of a message to be stored, the method 500 loops back to block 502 to continue to wait for a message. If the compute device 102 has received part of a message (e.g., one packet from a longer message), the method 500 proceeds to block 504.

In block 504, the compute device 102 stores the data included in the received part of the message to memory. The memory location used to store the data may be determined in any suitable manner, such as based on a parameter associated with the data being sent, a setting on the compute device 102, etc.

In block 506, the compute device 102 determines a data transfer rate to be used for sending the rest of the message. In block 508, the compute device 102 may determine a data transfer rate based on the bandwidth of the memory location used to store the data. The compute device 102 may determine a data transfer bandwidth of the memory location in any suitable way, such as by accessing a table or querying another component of the compute device 102. In block 510, the compute device 102 may determine a data transfer rate based on past performance data, which may include determining context data of the current data transfer for comparison. In block 512, the compute device 102 may determine a data transfer rate based on a current activity level of the I/O subsystem 206, which may be determined in any suitable way as discussed above, such as by monitoring the activity level of the I/O subsystem 206, by querying a component of the compute device 102 which monitors the activity level of the I/O subsystem 206, or by performing a test transfer over the I/O subsystem 206.

In block 514, the compute device 102 sends an acknowledgement of the data received including an indication of the determined data transfer rate. In block 516, the compute device 102 continues receiving and storing the data that is incoming as part of the message.

Figure 6:
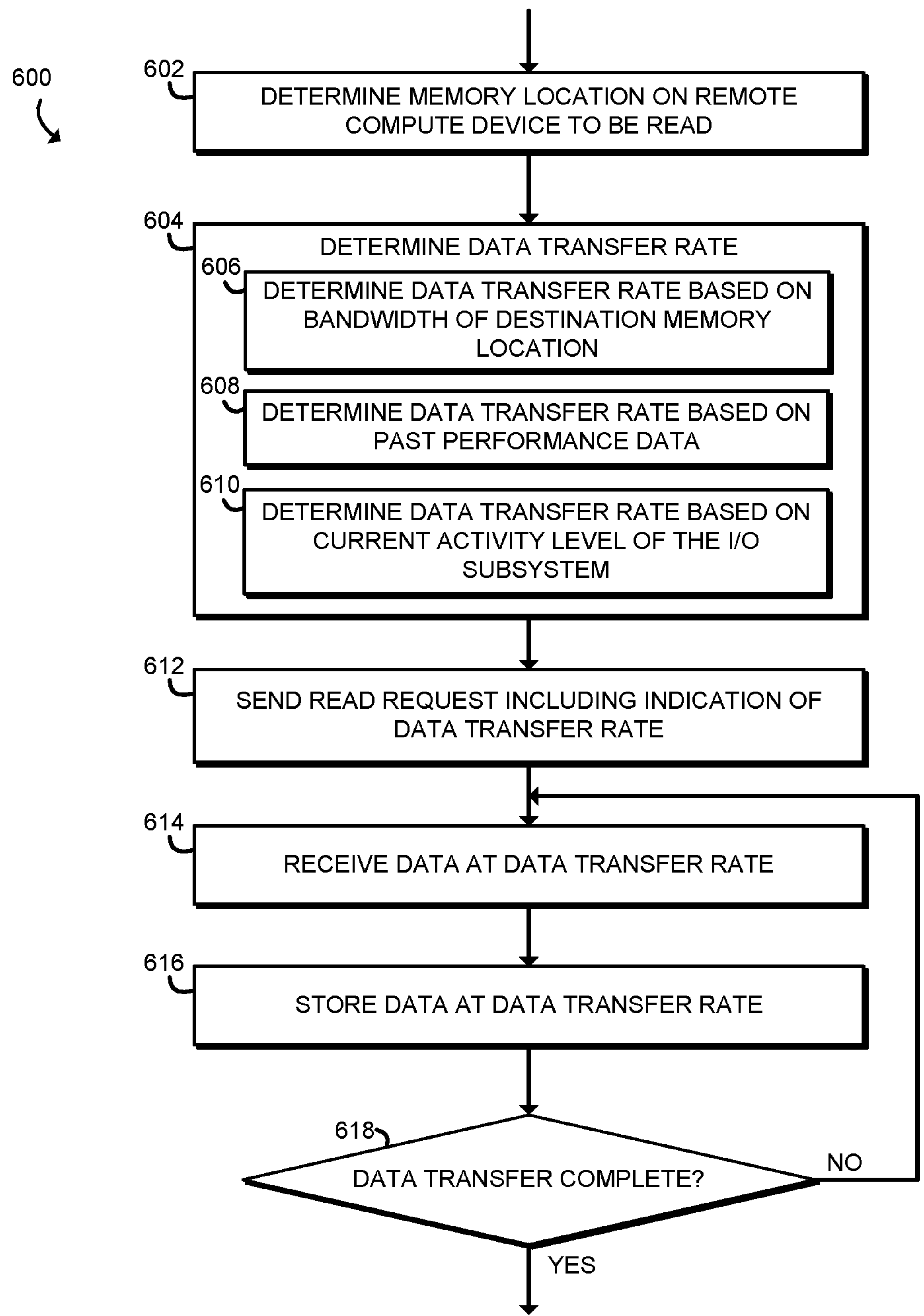
FIG. 6 is a simplified flow diagram of at least one embodiment of a method for reading remote data while avoiding endpoint congestion that may be executed by the compute device of FIG. 1.

Referring now to FIG. 6, in use, the compute device 102 may execute a method 600 for reading remote data while avoiding endpoint congestion. The method begins in block 602, in which the compute device 102 determines a memory location on a remote compute device 102 to be read.

In block 604, the compute device 102 determines a data transfer rate. The compute device 102 may determine the data transfer rate in blocks 606, 608, and 610 in a similar fashion as block 508, 510, and 512 in FIG. 5 above, which will not be repeated herein in the interest of clarity. In block 612, the compute device 102 sends a read request to the remote compute device 102 including the memory location to be read and an indication of the data transfer rate to be used.

In block 614, the compute device 102 receives data from the remote compute device 102 at the data transfer rate. The compute device 102 stores the data at the data transfer rate in block 616.

In block 618, if the data transfer is not complete, the compute device 102 loops back to block 614, in which further data is received. If the data transfer is complete, the method 600 is complete, and the compute device 102 may proceed with further tasks.

Figure 7:
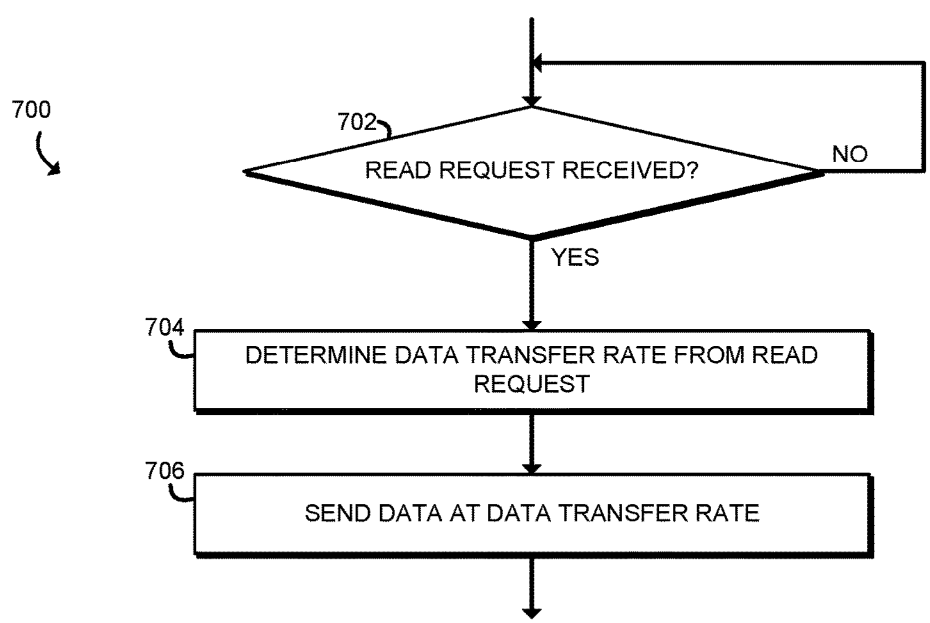
FIG. 7 is a simplified flow diagram of at least one embodiment of a method for sending reply data while avoiding endpoint congestion that may be executed by the compute device of FIG. 1.

Referring now to FIG. 7, in use, the compute device 102 may execute a method 700 for sending reply data while avoiding endpoint congestion. The method 700 begins in block 702, in which, if the compute device 102 has not received a read request, the method loops back to block 702 to wait for a read request. If the compute device 102 has received a read request, the method 700 proceeds to block 704.

In block 704, the compute device 102 determines a data transfer rate based on an indication of a data transfer rate that was included as part of the read request. In block 706, the compute device 102 sends data at the data transfer rate from a memory location specified by the read request.

Figure 8:
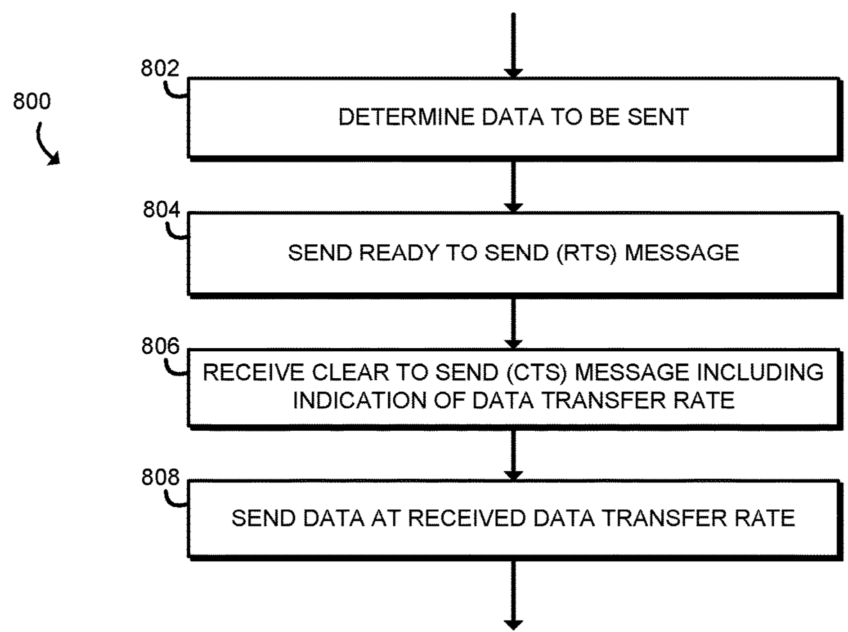
FIG. 8 is a simplified flow diagram of at least one embodiment of a method for sending data while avoiding endpoint congestion that may be executed by the compute device of FIG. 1.

Referring now to FIG. 8, in use, the compute device 102 may execute a method 800 for sending data while avoiding endpoint congestion. The method 800 begins in block 802, in which the compute device 102 determines or otherwise acquires data to be sent to a remote compute device 102. In block 804, the compute device 102 sends a ready to send (RTS) message to the remote compute device 102, indicating that the compute device 102 is prepared to send data to the remote compute device 102.

In block 806, the compute device 102 receives a clear to send (CTS) message from the remote compute device 102, which includes an indication of a data transfer rate to use for sending the data. In block 808, the compute device 102 sends the data at the received data transfer rate.

Figure 9:
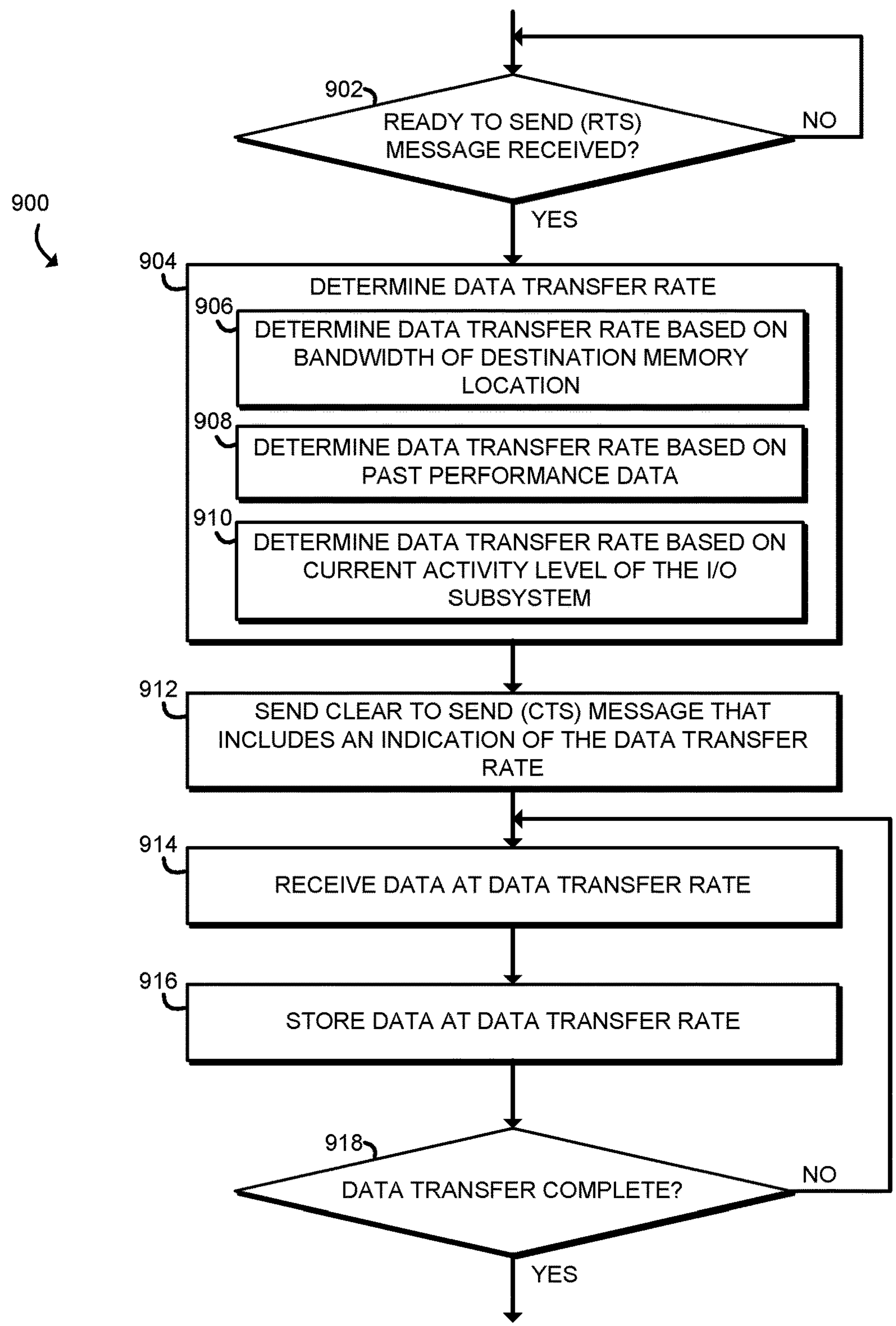
FIG. 9 is a simplified flow diagram of at least one embodiment of a method for receiving data while avoiding endpoint congestion that may be executed by the compute device of FIG. 1.

Referring now to FIG. 9, in use, the compute device 102 may execute a method 900 for receiving data while avoiding endpoint congestion. The method 900 begins in block 902, in which, if the compute device 102 has not received a ready to send (RTS) message, the compute device 102 loops back to block 902 to wait for a RTS message. If the compute device 102 has received a RTS message, the method proceeds to block 904.

In block 904, the compute device 102 determines a data transfer rate. The compute device 102 may determine the data transfer rate in blocks 906, 908, and 910 in a similar fashion as block 508, 510, and 512 in FIG. 5 above, which will not be repeated herein in the interest of clarity. In block 912, the compute device 102 sends a clear to send (CTS) message to the remote compute device 102 that includes an indication of the determined data transfer rate.

In block 914, the compute device 102 receives data from the remote compute device 102 at the data transfer rate. The compute device 102 stores the data at the data transfer rate 102 in block 916.

In block 918, if the data transfer is not complete, the compute device 102 loops back to block 914, in which further data is received. If the data transfer is complete, the method 900 is complete, and the compute device 102 may proceed with further tasks.

It should be appreciated that, in some embodiments, the techniques of the various methods described above may be used in conjunction with each other. For example, a compute device 102 may send an initial indication of a data transfer rate to a remote compute device 102, and then determine part-way through receipt of a message being sent that the data storage rate has changed, and the compute device 102 may then send an updated indication of a data transfer rate to the remote compute device 102.

EXAMPLES

Illustrative examples of the devices, systems, and methods disclosed herein are provided below. An embodiment of the devices, systems, and methods may include any one or more, and any combination of, the examples described below.

Example 1 includes a compute device for avoiding endpoint congestion, the compute device comprising a processor; a host fabric interface; and a memory comprising a plurality of instructions stored thereon that, when executed, cause the compute device to determine a message comprising data to be sent to a remote compute device; determine, by the host fabric interface, a data transfer rate indicative of a rate at which the remote compute device is able to store data transmitted by the host fabric interface, wherein the data transfer rate is less than a maximum data transfer rate of the host fabric interface; send, by the host fabric interface, the data to the remote compute device at a rate based on the determined data transfer rate.

Example 2 includes the subject matter of Example 1, and wherein the message comprises initial data and the data, wherein to determine the data transfer rate comprises to send a packet comprising the initial data to the remote compute device; and receive an acknowledgement of receipt of the packet from the remote compute device, wherein the acknowledgement comprises an indication of the data transfer rate.

Example 3 includes the subject matter of any of Examples 1 and 2, and wherein to send the packet to the remote compute device comprises to send the packet to the remote compute device at a past data transfer rate based on past performance data indicative of a past data storage rate of the remote compute device.

Example 4 includes the subject matter of any of Examples 1-3, and wherein the plurality of instructions further cause the compute device to update the past performance data based on the indication of the data transfer rate.

Example 5 includes the subject matter of any of Examples 1-4, and wherein the plurality of instructions further cause the compute device to delete information from the past performance data that is associated with a data transfer that occurred more than a threshold period of ago.

Example 6 includes the subject matter of any of Examples 1-5, and wherein to determine the message to be sent comprises to receive, by the host fabric interface and from the remote compute device, a read request, wherein the read request comprises an indication of a memory location of the data and an indication of the data transfer rate, wherein to determine the data transfer rate comprises to determine the data transfer rate based on the indication of the data transfer rate, and wherein to send the data comprises to read, by the host fabric interface, the data from the memory location.

Example 7 includes the subject matter of any of Examples 1-6, and wherein to send the data comprises to send a ready to send (RTS) message to the remote compute device; receive, from the remote compute device, a clear to send (CTS) message, wherein the CTS message comprises an indication of the data transfer rate; and send, in response to receipt of the CTS message, the data, wherein to determine the data transfer rate comprises to determine the data transfer rate based on the indication of the data transfer rate.

Example 8 includes the subject matter of any of Examples 1-7, and wherein to send the data to the remote compute device at the rate based on the determined data transfer rate comprises to send the data to the remote compute device at a rate no higher than the data transfer rate.

Example 9 includes the subject matter of any of Examples 1-8, and wherein to send the data to the remote compute device at the rate based on the determined data transfer rate comprises to send the data to the remote compute device at the data transfer rate.

Example 10 includes the subject matter of any of Examples 1-9, and wherein the host fabric interface is in its own package separate from the processor.

Example 11 includes the subject matter of any of Examples 1-10, and wherein the host fabric interface is in a multi-chip package with the processor or is in a system-on-a-chip with the processor.

Example 12 includes the subject matter of any of Examples 1-11, and further including data storage and a display.

Example 13 includes a compute device for avoiding endpoint congestion, the compute device comprising a processor; a host fabric interface; and a memory comprising a plurality of instructions stored thereon that, when executed, cause the compute device to determine, by the host fabric interface, a data transfer rate indicative of a rate at which the compute device is able to store data received by the host fabric interface, wherein the data transfer rate is less than a maximum data transfer rate of the host fabric interface; send, by the host fabric interface, an indication of the data transfer rate to a remote compute device; receive, by the host fabric interface, data from the remote compute device at a rate based on the indication of the data transfer rate.

Example 14 includes the subject matter of Example 13, and wherein to determine the data transfer rate comprises to determine a memory location for storage of the data; determine a bandwidth associated with the memory location; and determine the data transfer rate based on the bandwidth associated with the memory location.

Example 15 includes the subject matter of any of Examples 13 and 14, and wherein to determine the data transfer rate comprises to determine context data associated with the data to be transferred; determine a past data transfer rate based on the context data and past performance data; determine the data transfer rate based on the past data transfer rate.

Example 16 includes the subject matter of any of Examples 13-15, and wherein to determine the data transfer rate comprises to determine a current activity level of an input/output (I/O) subsystem of the compute device; and determine, based on the current activity level of the I/O subsystem, the data transfer rate.

Example 17 includes the subject matter of any of Examples 13-16, and wherein to send the indication of the data transfer rate comprises to receive, prior to receipt of the data and from the remote compute device, a packet comprising intial data; and send, to the remote compute device, an acknowledgement of receipt of the packet, wherein the acknowledgement comprises the indication of the data transfer rate.

Example 18 includes the subject matter of any of Examples 13-17, and wherein to send the indication of the data transfer rate to the remote compute device comprises to determine a remote memory location to be read; send, to the remote compute device, a read request comprising the remote memory location and the data transfer rate.

Example 19 includes the subject matter of any of Examples 13-18, and wherein the plurality of instructions further cause the compute device to receive, from the remote compute device, a ready to send (RTS) message, wherein to determine, by the host fabric interface, the data transfer rate comprises to determine, by the host fabric interface, the data transfer rate in response to receipt of the RTS message, wherein to send, by the host fabric interface, the indication of the data transfer rate to the remote compute device comprises to send, by the host fabric interface and in response to receipt of the RTS message, a clear to send (CTS) message comprising the indication of the data transfer rate.

Example 20 includes the subject matter of any of Examples 13-19, and wherein to receive the data from the remote compute device at the rate based on the indication of the data transfer rate comprises to receive the data at a rate no higher than the data transfer rate.

Example 21 includes the subject matter of any of Examples 13-20, and wherein to receive the data from the remote compute device at the rate based on the indication of the data transfer rate comprises to receive the data at the data transfer rate.

Example 22 includes the subject matter of any of Examples 13-21, and wherein the host fabric interface is in its own package separate from the processor.

Example 23 includes the subject matter of any of Examples 13-22, and wherein the host fabric interface is in a multi-chip package with the processor or is in a system-on-a-chip with the processor.

Example 24 includes the subject matter of any of Examples 13-23, and further including data storage and a display.

Example 25 includes a method for avoiding endpoint congestion by a compute device, the method comprising determining, by the compute device, a message comprising data to be sent to a remote compute device; determining, by a host fabric interface of the compute device, a data transfer rate indicative of a rate the remote compute device is able to store data transmitted by the host fabric interface, wherein the data transfer rate is less than a maximum data transfer rate of the host fabric interface; sending, by the host fabric interface, the data to the remote compute device at a rate based on the determined data transfer rate.

Example 26 includes the subject matter of Example 25, and wherein the message comprises initial data and the data, wherein determining the data transfer rate comprises sending a packet comprising the initial data to the remote compute device; and receiving an acknowledgement of receipt of the packet from the remote compute device, wherein the acknowledgement comprises an indication of the data transfer rate.

Example 27 includes the subject matter of any of Examples 25 and 26, and wherein sending the packet to the remote compute device comprises sending the packet to the remote compute device at a past data transfer rate based on past performance data indicative of a past data storage rate of the remote compute device.

Example 28 includes the subject matter of any of Examples 25-27, and further including updating the past performance data based on the indication of the data transfer rate.

Example 29 includes the subject matter of any of Examples 25-28, and further including deleting information from the past performance data that is associated with a data transfer that occurred more than a threshold period of ago.

Example 30 includes the subject matter of any of Examples 25-29, and wherein determining the message to be sent comprises receiving, by the host fabric interface and from the remote compute device, a read request, wherein the read request comprises an indication of a memory location of the data and an indication of the data transfer rate, wherein determining the data transfer rate comprises determining the data transfer rate based on the indication of the data transfer rate, and wherein sending the data comprises reading, by the host fabric interface, the data from the memory location.

Example 31 includes the subject matter of any of Examples 25-30, and wherein sending the data comprises sending a ready to send (RTS) message to the remote compute device; receiving, from the remote compute device, a clear to send (CTS) message, wherein the CTS message comprises an indication of the data transfer rate; and sending, in response to receipt of the CTS message, the data, wherein determining the data transfer rate comprises determining the data transfer rate based on the indication of the data transfer rate.

Example 32 includes the subject matter of any of Examples 25-31, and wherein sending the data to the remote compute device at the rate based on the determined data transfer rate comprises sending the data to the remote compute device at a rate no higher than the data transfer rate.

Example 33 includes the subject matter of any of Examples 25-32, and wherein sending the data to the remote compute device at the rate based on the determined data transfer rate comprises sending the data to the remote compute device at the data transfer rate.

Example 34 includes the subject matter of any of Examples 25-33, and wherein the host fabric interface is in its own package separate from the processor.

Example 35 includes the subject matter of any of Examples 25-34, and wherein the host fabric interface is in a multi-chip package with the processor or is in a system-on-a-chip with the processor.

Example 36 includes a method for avoiding endpoint congestion by a compute device, the method comprising determining, by a host fabric interface of the compute device, a data transfer rate indicative of a rate at which the compute device is able to store data received by the host fabric interface, wherein the data transfer rate is less than a maximum data transfer rate of the host fabric interface; sending, by the host fabric interface, an indication of the data transfer rate to a remote compute device; receiving, by the host fabric interface, data from the remote compute device at a rate based on the indication of the data transfer rate.

Example 37 includes the subject matter of Example 36, and wherein determining the data transfer rate comprises determining a memory location for storage of the data; determining a bandwidth associated with the memory location; and determining the data transfer rate based on the bandwidth associated with the memory location.

Example 38 includes the subject matter of any of Examples 36 and 37, and wherein determining the data transfer rate comprises determining context data associated with the data to be transferred; determining a past data transfer rate based on the context data and past performance data; determining the data transfer rate based on the past data transfer rate.

Example 39 includes the subject matter of any of Examples 36-38, and wherein determining the data transfer rate comprises determining a current activity level of an input/output (I/O) subsystem of the compute device; and determining, based on the current activity level of the I/O subsystem, the data transfer rate.

Example 40 includes the subject matter of any of Examples 36-39, and wherein sending the indication of the data transfer rate comprises receiving, prior to receipt of the data and from the remote compute device, a packet comprising initial data; and sending, to the remote compute device, an acknowledgement of receipt of the packet, wherein the acknowledgement comprises the indication of the data transfer rate.

Example 41 includes the subject matter of any of Examples 36-40, and wherein sending the indication of the data transfer rate to the remote compute device comprises determining, by the compute device, a remote memory location to be read; sending, by the compute device and to the remote compute device, a read request comprising the remote memory location and the data transfer rate.

Example 42 includes the subject matter of any of Examples 36-41, and further including receiving, from the remote compute device, a ready to send (RTS) message, wherein determining, by the host fabric interface, the data transfer rate comprises determining, by the host fabric interface, the data transfer rate in response to receipt of the RTS message, wherein sending, by the host fabric interface, the indication of the data transfer rate to the remote compute device comprises sending, by the host fabric interface and in response to receipt of the RTS message, a clear to send (CTS) message comprising the indication of the data transfer rate.

Example 43 includes the subject matter of any of Examples 36-42, and wherein receiving the data from the remote compute device at the rate based on the indication of the data transfer rate comprises receiving the data at a rate no higher than the data transfer rate.

Example 44 includes the subject matter of any of Examples 36-43, and wherein receiving the data from the remote compute device at the rate based on the indication of the data transfer rate comprises receiving the data at the data transfer rate.

Example 45 includes the subject matter of any of Examples 36-44, and wherein the host fabric interface is in its own package separate from the processor.

Example 46 includes the subject matter of any of Examples 36-45, and wherein the host fabric interface is in a multi-chip package with the processor or is in a system-on-a-chip with the processor.

Example 47 includes one or more computer-readable media comprising a plurality of instructions stored thereon that, when executed, causes a compute device to perform the method of any of Examples 25-44.

Example 48 includes a compute device for avoiding endpoint congestion, the compute device comprising a host fabric interface; means for determining a message comprising data to be sent to a remote compute device; means for determining, by the host fabric interface, a data transfer rate indicative of a rate at which the remote compute device is able to store data transmitted by the host fabric interface, wherein the data transfer rate is less than a maximum data transfer rate of the host fabric interface; means for sending, by the host fabric interface, the data to the remote compute device at a rate based on the determined data transfer rate.

Example 49 includes the subject matter of Example 48, and wherein the message comprises initial data and the data, wherein the means for determining the data transfer rate comprises means for sending a packet comprising the initial data to the remote compute device; and means for receiving an acknowledgement of receipt of the packet from the remote compute device, wherein the acknowledgement comprises an indication of the data transfer rate.

Example 50 includes the subject matter of any of Examples 48 and 49, and wherein the means for sending the packet to the remote compute device comprises means for sending the packet to the remote compute device at a past data transfer rate based on past performance data indicative of a past data storage rate of the remote compute device.

Example 51 includes the subject matter of any of Examples 48-50, and further including means for updating the past performance data based on the indication of the data transfer rate.

Example 52 includes the subject matter of any of Examples 48-51, and further including means for deleting information from the past performance data that is associated with a data transfer that occurred more than a threshold period of ago.

Example 53 includes the subject matter of any of Examples 48-52, and wherein the means for determining the message to be sent comprises means for receiving, by the host fabric interface and from the remote compute device, a read request, wherein the read request comprises an indication of a memory location of the data and an indication of the data transfer rate, wherein the means for determining the data transfer rate comprises means for determining the data transfer rate based on the indication of the data transfer rate, and wherein the means for sending the data comprises means for reading, by the host fabric interface, the data from the memory location.

Example 54 includes the subject matter of any of Examples 48-53, and wherein the means for sending the data comprises means for sending a ready to send (RTS) message to the remote compute device; means for receiving, from the remote compute device, a clear to send (CTS) message, wherein the CTS message comprises an indication of the data transfer rate; and means for sending, in response to receipt of the CTS message, the data, wherein the means for determining the data transfer rate comprises means for determining the data transfer rate based on the indication of the data transfer rate.

Example 55 includes the subject matter of any of Examples 48-54, and wherein the means for sending the data to the remote compute device at the rate based on the determined data transfer rate comprises means for sending the data to the remote compute device at a rate no higher than the data transfer rate.

Example 56 includes the subject matter of any of Examples 48-55, and wherein the means for sending the data to the remote compute device at the rate based on the determined data transfer rate comprises means for sending the data to the remote compute device at the data transfer rate.

Example 57 includes the subject matter of any of Examples 48-56, and wherein the host fabric interface is in its own package separate from the processor.

Example 58 includes the subject matter of any of Examples 48-57, and wherein the host fabric interface is in a multi-chip package with the processor or is in a system-on-a-chip with the processor.

Example 59 includes the subject matter of any of Examples 48-58, and further including data storage and a display.

Example 60 includes a compute device for avoiding endpoint congestion, the compute device comprising a host fabric interface; means for determining, by the host fabric interface, a data transfer rate indicative of a rate at which the compute device is able to store data received by the host fabric interface, wherein the data transfer rate is less than a maximum data transfer rate of the host fabric interface; means for sending, by the host fabric interface, an indication of the data transfer rate to a remote compute device; means for receiving, by the host fabric interface, data from the remote compute device at a rate based on the indication of the data transfer rate.

Example 61 includes the subject matter of Example 60, and wherein the means for determining the data transfer rate comprises means for determining a memory location for storage of the data; means for determining a bandwidth associated with the memory location; and means for determining the data transfer rate based on the bandwidth associated with the memory location.

Example 62 includes the subject matter of any of Examples 60 and 61, and wherein the means for determining the data transfer rate comprises means for determining context data associated with the data to be transferred; means for determining a past data transfer rate based on the context data and past performance data; means for determining the data transfer rate based on the past data transfer rate.

Example 63 includes the subject matter of any of Examples 60-62, and wherein the means for determining the data transfer rate comprises means for determining a current activity level of an input/output (I/O) subsystem of the compute device; and means for determining, based on the current activity level of the I/O subsystem, the data transfer rate.

Example 64 includes the subject matter of any of Examples 60-63, and wherein the means for sending the indication of the data transfer rate comprises means for receiving, prior to receipt of the data and from the remote compute device, a packet comprising initial data; and means for sending, to the remote compute device, an acknowledgement of receipt of the packet, wherein the acknowledgement comprises the indication of the data transfer rate.

Example 65 includes the subject matter of any of Examples 60-64, and wherein the means for sending the indication of the data transfer rate to the remote compute device comprises means for determining a remote memory location to be read; means for sending, to the remote compute device, a read request comprising the remote memory location and the data transfer rate.

Example 66 includes the subject matter of any of Examples 60-65, and further including means for receiving, from the remote compute device, a ready to send (RTS) message, wherein the means for determining, by the host fabric interface, the data transfer rate comprises means for determining, by the host fabric interface, the data transfer rate in response to receipt of the RTS message, wherein the means for sending, by the host fabric interface, the indication of the data transfer rate to the remote compute device comprises means for sending, by the host fabric interface and in response to receipt of the RTS message, a clear to send (CTS) message comprising the indication of the data transfer rate.

Example 67 includes the subject matter of any of Examples 60-66, and wherein the means for receiving the data from the remote compute device at the rate based on the indication of the data transfer rate comprises means for receiving the data at a rate no higher than the data transfer rate.

Example 68 includes the subject matter of any of Examples 60-67, and wherein the means for receiving the data from the remote compute device at the rate based on the indication of the data transfer rate comprises means for receiving the data at the data transfer rate.

Example 69 includes the subject matter of any of Examples 60-68, and wherein the host fabric interface is in its own package separate from the processor.

Example 70 includes the subject matter of any of Examples 60-69, and wherein the host fabric interface is in a multi-chip package with the processor or is in a system-on-a-chip with the processor.

Example 71 includes the subject matter of any of Examples 60-70, and further including data storage and a display.

Example 72 includes a compute device for avoiding endpoint congestion, the compute device comprising a host fabric interface; and a host fabric interface controller to determine a message comprising data to be sent to a remote compute device; determine, by the host fabric interface, a data transfer rate indicative of a rate at which the remote compute device is able to store data transmitted by the host fabric interface, wherein the data transfer rate is less than a maximum data transfer rate of the host fabric interface; send, by the host fabric interface, the data to the remote compute device at a rate based on the determined data transfer rate.

Example 73 includes the subject matter of Example 72, and wherein the message comprises initial data and the data, wherein to determine the data transfer rate comprises to send a packet comprising the initial data to the remote compute device; and receive an acknowledgement of receipt of the packet from the remote compute device, wherein the acknowledgement comprises an indication of the data transfer rate.

Example 74 includes the subject matter of any of Examples 72 and 73, and wherein to send the packet to the remote compute device comprises to send the packet to the remote compute device at a past data transfer rate based on past performance data indicative of a past data storage rate of the remote compute device.

Example 75 includes the subject matter of any of Examples 72-74, and wherein the host fabric interface controller is further to update the past performance data based on the indication of the data transfer rate.

Example 76 includes the subject matter of any of Examples 72-75, and wherein the host fabric interface controller is further to delete information from the past performance data that is associated with a data transfer that occurred more than a threshold period of ago.

Example 77 includes the subject matter of any of Examples 72-76, and wherein to determine the message to be sent comprises to receive, by the host fabric interface and from the remote compute device, a read request, wherein the read request comprises an indication of a memory location of the data and an indication of the data transfer rate, wherein to determine the data transfer rate comprises to determine the data transfer rate based on the indication of the data transfer rate, and wherein to send the data comprises to read, by the host fabric interface, the data from the memory location.

Example 78 includes the subject matter of any of Examples 72-77, and wherein to send the data comprises to send a ready to send (RTS) message to the remote compute device; receive, from the remote compute device, a clear to send (CTS) message, wherein the CTS message comprises an indication of the data transfer rate; and send, in response to receipt of the CTS message, the data, wherein to determine the data transfer rate comprises to determine the data transfer rate based on the indication of the data transfer rate.

Example 79 includes the subject matter of any of Examples 72-78, and wherein to send the data to the remote compute device at the rate based on the determined data transfer rate comprises to send the data to the remote compute device at a rate no higher than the data transfer rate.

Example 80 includes the subject matter of any of Examples 72-79, and wherein to send the data to the remote compute device at the rate based on the determined data transfer rate comprises to send the data to the remote compute device at the data transfer rate.

Example 81 includes the subject matter of any of Examples 72-80, and wherein the host fabric interface is in its own package separate from the processor.

Example 82 includes the subject matter of any of Examples 72-81, and wherein the host fabric interface is in a multi-chip package with the processor or is in a system-on-a-chip with the processor.

Example 83 includes the subject matter of any of Examples 72-82, and further including data storage and a display.

Example 84 includes a compute device for avoiding endpoint congestion, the compute device comprising a host fabric interface; and a host fabric interface controller to determine, by the host fabric interface, a data transfer rate indicative of a rate at which the compute device is able to store data received by the host fabric interface, wherein the data transfer rate is less than a maximum data transfer rate of the host fabric interface; send, by the host fabric interface, an indication of the data transfer rate to a remote compute device; receive, by the host fabric interface, data from the remote compute device at a rate based on the indication of the data transfer rate.

Example 85 includes the subject matter of Example 84, and wherein to determine the data transfer rate comprises to determine a memory location for storage of the data; determine a bandwidth associated with the memory location; and determine the data transfer rate based on the bandwidth associated with the memory location.

Example 86 includes the subject matter of any of Examples 84 and 85, and wherein to determine the data transfer rate comprises to determine context data associated with the data to be transferred; determine a past data transfer rate based on the context data and past performance data; determine the data transfer rate based on the past data transfer rate.

Example 87 includes the subject matter of any of Examples 84-86, and wherein to determine the data transfer rate comprises to determine a current activity level of an input/output (I/O) subsystem of the compute device; and determine, based on the current activity level of the I/O subsystem, the data transfer rate.

Example 88 includes the subject matter of any of Examples 84-87, and wherein to send the indication of the data transfer rate comprises to receive, prior to receipt of the data and from the remote compute device, a packet comprising initial data; and send, to the remote compute device, an acknowledgement of receipt of the packet, wherein the acknowledgement comprises the indication of the data transfer rate.

Example 89 includes the subject matter of any of Examples 84-88, and wherein to send the indication of the data transfer rate to the remote compute device comprises to determine a remote memory location to be read; send, to the remote compute device, a read request comprising the remote memory location and the data transfer rate.

Example 90 includes the subject matter of any of Examples 84-89, and wherein the host fabric interface controller is further to receive, from the remote compute device, a ready to send (RTS) message, wherein to determine, by the host fabric interface, the data transfer rate comprises to determine, by the host fabric interface, the data transfer rate in response to receipt of the RTS message, wherein to send, by the host fabric interface, the indication of the data transfer rate to the remote compute device comprises to send, by the host fabric interface and in response to receipt of the RTS message, a clear to send (CTS) message comprising the indication of the data transfer rate.

Example 91 includes the subject matter of any of Examples 84-90, and wherein to receive the data from the remote compute device at the rate based on the indication of the data transfer rate comprises to receive the data at a rate no higher than the data transfer rate.

Example 92 includes the subject matter of any of Examples 84-91, and wherein to receive the data from the remote compute device at the rate based on the indication of the data transfer rate comprises to receive the data at the data transfer rate.

Example 93 includes the subject matter of any of Examples 84-92, and wherein the host fabric interface is in its own package separate from the processor.

Example 94 includes the subject matter of any of Examples 84-93, and wherein the host fabric interface is in a multi-chip package with the processor or is in a system-on-a-chip with the processor.

Example 95 includes the subject matter of any of Examples 84-94, and further including data storage and a display.

The invention claimed is:

1. A compute device for avoiding endpoint congestion, the compute device comprising:
- a processor;
- a host fabric interface; and
- a memory comprising a plurality of instructions stored thereon that, when executed, cause the compute device to:

determine a message comprising data to be sent to a remote compute device, wherein the message comprises initial data and the data;
- determine, by the host fabric interface, a data transfer rate indicative of a rate at which the remote compute device is able to store data transmitted by the host fabric interface, wherein the data transfer rate is less than a maximum data transfer rate of the host fabric interface, but greater than zero, and wherein to determine the data transfer rate comprises to: send a packet comprising the initial data to the remote compute device and receive an acknowledgement of receipt of the packet from the remote compute device, wherein the acknowledgement comprises an indication of the data transfer rate;
- send, by the host fabric interface, the data to the remote compute device at a rate based on the determined data transfer rate, wherein to send the packet to the remote compute device comprises to send the packet to the remote compute device at a past data transfer rate based on past performance data indicative of a past data storage rate of the remote compute device.

2. The compute device of claim 1, wherein the plurality of instructions further cause the compute device to update the past performance data based on the indication of the data transfer rate.

3. The compute device of claim 1, wherein to determine the message to be sent comprises to receive, by the host fabric interface and from the remote compute device, a read request, wherein the read request comprises an indication of a memory location of the data and an indication of the data transfer rate, wherein to determine the data transfer rate comprises to determine the data transfer rate based on the indication of the data transfer rate, and wherein to send the data comprises to read, by the host fabric interface, the data from the memory location.

4. The compute device of claim 1, wherein to send the data comprises to:

send a ready to send (RTS) message to the remote compute device;

receive, from the remote compute device, a clear to send (CTS) message, wherein the CTS message comprises an indication of the data transfer rate; and send, in response to receipt of the CTS message, the data, wherein to determine the data transfer rate comprises to determine the data transfer rate based on the indication of the data transfer rate.

5. The compute device of claim 1, wherein to send the data to the remote compute device at the rate based on the determined data transfer rate comprises to send the data to the remote compute device at a rate no higher than the data transfer rate.

6. The compute device of claim 1, wherein the host fabric interface is in its own package separate from the processor.

7. The compute device of claim 1, wherein the host fabric interface is in a multi-chip package with the processor or is in a system-on-a-chip with the processor.

8. One or more computer-readable media comprising a plurality of instructions stored thereon that, when executed, causes a compute device to:

determine a message comprising data to be sent to a remote compute device, wherein the message comprises initial data and the data;

determine, by a host fabric interface of the compute device, a data transfer rate indicative of a rate at which the remote compute device is able to store data transmitted by the host fabric interface, wherein the data transfer rate is less than a maximum data transfer rate of the host fabric interface, but greater than zero, and wherein to determine the data transfer rate comprises to: send a packet comprising the initial data to the remote compute device and receive an acknowledgement of receipt of the packet from the remote compute device, wherein the acknowledgement comprises an indication of the data transfer rate; and send, by the host fabric interface, the data to the remote compute device at a rate based on the determined data transfer rate, wherein to send the packet to the remote compute device comprises to send the packet to the remote compute device at a past data transfer rate based on past performance data indicative of a past data storage rate of the remote compute device.

9. The one or more computer-readable media of claim 8, wherein the plurality of instructions further cause the compute device to update the past performance data based on the indication of the data transfer rate.

10. The one or more computer-readable media of claim 8, wherein to determine the message to be sent comprises to receive, by the host fabric interface and from the remote compute device, a read request, wherein the read request comprises an indication of a memory location of the data and an indication of the data transfer rate, wherein to determine the data transfer rate comprises to determine the data transfer rate based on the indication of the data transfer rate, and wherein to send the data comprises to read, by the host fabric interface, the data from the memory location.

11. The one or more computer-readable media of claim 8, wherein to send the data to the remote compute device at the rate based on the determined data transfer rate comprises to send the data to the remote compute device at a rate no higher than the data transfer rate.

12. A compute device for avoiding endpoint congestion, the compute device comprising:

a host fabric interface;

means for determining a message comprising data to be sent to a remote compute device wherein the message comprises initial data and the data;

means for determining, by the host fabric interface, a data transfer rate indicative of a rate at which the remote compute device is able to store data transmitted by the host fabric interface, wherein the data transfer rate is less than a maximum data transfer rate of the host fabric interface, but greater than zero, and wherein to determine the data transfer rate comprises to: send a packet comprising the initial data to the remote compute device and receive an acknowledgement of receipt of the packet from the remote compute device, wherein the acknowledgement comprises an indication of the data transfer rate; and means for sending, by the host fabric interface, the data to the remote compute device at a rate based on the determined data transfer rate, wherein to send the packet to the remote compute device comprises to send the packet to the remote compute device at a past data transfer rate based on past performance data indicative of a past data storage rate of the remote compute device.

13. The compute device of claim 12, further comprising means for updating the past performance data based on the indication of the data transfer rate.

14. The compute device of claim 12, wherein the means for determining the message to be sent comprises means for receiving, by the host fabric interface and from the remote compute device, a read request, wherein the read request comprises an indication of a memory location of the data and an indication of the data transfer rate, wherein the means for determining the data transfer rate comprises means for determining the data transfer rate based on the indication of the data transfer rate, and wherein the means for sending the data comprises means for reading, by the host fabric interface, the data from the memory location.

* * * * *